United States Patent
Chin et al.

(10) Patent No.: US 8,670,330 B2
(45) Date of Patent: Mar. 11, 2014

(54) METHODS AND APPARATUS TO PERFORM REFERENCE SIGNAL MEASUREMENTS IN A TDD-LTE SYSTEM FROM A TD-SCDMA SYSTEM

(75) Inventors: Tom Chin, San Diego, CA (US);
Guangming Shi, San Diego, CA (US);
Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 13/014,242

(22) Filed: Jan. 26, 2011

(65) Prior Publication Data
US 2012/0188877 A1    Jul. 26, 2012

(51) Int. Cl.
*H04W 4/00* (2009.01)
*H04W 72/04* (2009.01)
*H04L 12/26* (2006.01)
*H04B 7/216* (2006.01)

(52) U.S. Cl.
USPC ........ 370/241.1; 370/252; 370/280; 370/329; 370/331; 370/335; 455/436

(58) Field of Classification Search
USPC ............. 370/241–253, 280, 329, 331, 335; 455/436–456.6
See application file for complete search history.

(56) References Cited

U.S. PATENT DOCUMENTS

| | | | |
|---|---|---|---|
| 2009/0042559 A1* | 2/2009 | Choi | 455/423 |
| 2009/0196197 A1 | 8/2009 | Digirolamo et al. | |
| 2010/0034126 A1 | 2/2010 | Kitazoe et al. | |
| 2010/0172311 A1 | 7/2010 | Agrawal et al. | |
| 2011/0194523 A1* | 8/2011 | Chung et al. | 370/329 |
| 2012/0082070 A1* | 4/2012 | Hart et al. | 370/280 |
| 2012/0088516 A1* | 4/2012 | Ji et al. | 455/452.1 |
| 2012/0093073 A1* | 4/2012 | Lunttila et al. | 370/328 |
| 2012/0120789 A1* | 5/2012 | Ramachandran et al. | 370/220 |
| 2012/0163307 A1* | 6/2012 | Wang et al. | 370/329 |
| 2012/0281563 A1* | 11/2012 | Comsa et al. | 370/252 |

FOREIGN PATENT DOCUMENTS

EP    2262318    12/2010
WO    03043237 A1    5/2003

OTHER PUBLICATIONS

International Search Report and Written Opinion—PCT/US2011/025117—ISA/EPO—Nov. 23, 2011.
Peng M., et al., "Technologies and standards for TD-SCDMA evolutions to IMT-advanced", IEEE Communications Magazine, IEEE Service Center, Piscataway, US, vol. 47, No. 12, Dec. 1, 2009, pp. 50-58, XP011285853.

* cited by examiner

*Primary Examiner* — Afsar M Qureshi
(74) *Attorney, Agent, or Firm* — Kristine U. Ekwueme

(57) ABSTRACT

Methods and apparatus are provided for performing measurement of reference signals in the proper subframes of a first radio access technology (RAT) while operating in a second RAT. For certain aspects, the first and second RATs may be Time Division Duplex Long Term Evolution (TDD-LTE) and Time Division-Synchronous Code Division Multiple Access (TD-SCDMA), respectively. By knowing the correct TDD-LTE downlink and uplink subframe configurations, a user equipment device (UE) may temporarily leave the TD-SCDMA network during an idle interval and perform expedited and accurate measurement of TDD-LTE reference signals without errors from trying to measure reference signals during uplink subframes.

92 Claims, 12 Drawing Sheets

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

FIG. 8

METHODS AND APPARATUS TO PERFORM REFERENCE SIGNAL MEASUREMENTS IN A TDD-LTE SYSTEM FROM A TD-SCDMA SYSTEM

BACKGROUND

1. Field

Certain aspects of the present disclosure generally relate to wireless communications and, more particularly, to performing reference signal measurements in a TDD-LTE (Time Division Duplex Long Term Evolution) system while operating in a Time Division-Synchronous Code Division Multiple Access (TD-SCDMA) system.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, in certain locations, TD-SCDMA is being pursued as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies, not only to meet the growing demand for mobile broadband access, but to advance and enhance the user experience with mobile communications.

SUMMARY

In an aspect of the disclosure, a method for wireless communications is provided. The method generally includes operating according to a first radio access technology (RAT) and determining at least a portion of certain subframes associated with a second RAT in which downlink reference signals are transmitted.

In an aspect of the disclosure, an apparatus for wireless communications is provided. The apparatus generally includes means for operating according to a first RAT and means for determining at least a portion of certain subframes associated with a second RAT in which downlink reference signals are transmitted.

In an aspect of the disclosure, an apparatus for wireless communications is provided. The apparatus generally includes at least one processor and a memory coupled to the at least one processor. The at least one processor is typically configured to operate according to a first RAT and to determine at least a portion of certain subframes associated with a second RAT in which downlink reference signals are transmitted.

In an aspect of the disclosure, a computer-program product for wireless communications is provided. The computer-program product generally includes a computer-readable medium having code for operating according to a first RAT and for determining at least a portion of certain subframes associated with a second RAT in which downlink reference signals are transmitted.

In an aspect of the disclosure, a method for wireless communications is provided. The method generally includes transmitting from a first cell operating with a first RAT, an indication of one or more subframes of a second RAT having downlink reference signals to a user equipment (UE) and receiving from the UE, an indication of a parameter of the downlink reference signals received at the UE from a second cell operating with the second RAT.

In an aspect of the disclosure, an apparatus for wireless communications is provided. The apparatus generally includes means for transmitting, from the apparatus operating with a first RAT, an indication of one or more subframes of a second RAT having downlink reference signals to a UE; and means for receiving, from the UE, an indication of a parameter of the downlink reference signals received at the UE from a cell operating with the second RAT.

In an aspect of the disclosure, an apparatus for wireless communications is provided. The apparatus generally includes a transmitter configured to transmit, from the apparatus operating with a first RAT, an indication of one or more subframes of a second RAT having downlink reference signals to a UE; and a receiver configured to receive, from the UE, an indication of a parameter of the downlink reference signals received at the UE from a cell operating with the second RAT.

In an aspect of the disclosure, a computer-program product for wireless communications is provided. The computer-program product generally includes a computer-readable medium having code for transmitting, from a first cell operating with a first RAT, an indication of one or more subframes of a second RAT having downlink reference signals to a UE; and for receiving, from the UE, an indication of a parameter of the downlink reference signals received at the UE from a second cell operating with the second RAT.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

FIG. 8 illustrates how the UE may measure the RSs at only certain TDD-LTE subframes from the table of DL/UL subframe configurations of FIG. 5B, irrespective of the UL-DL configuration, in accordance with certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

An Example Telecommunications System

Figure 1:
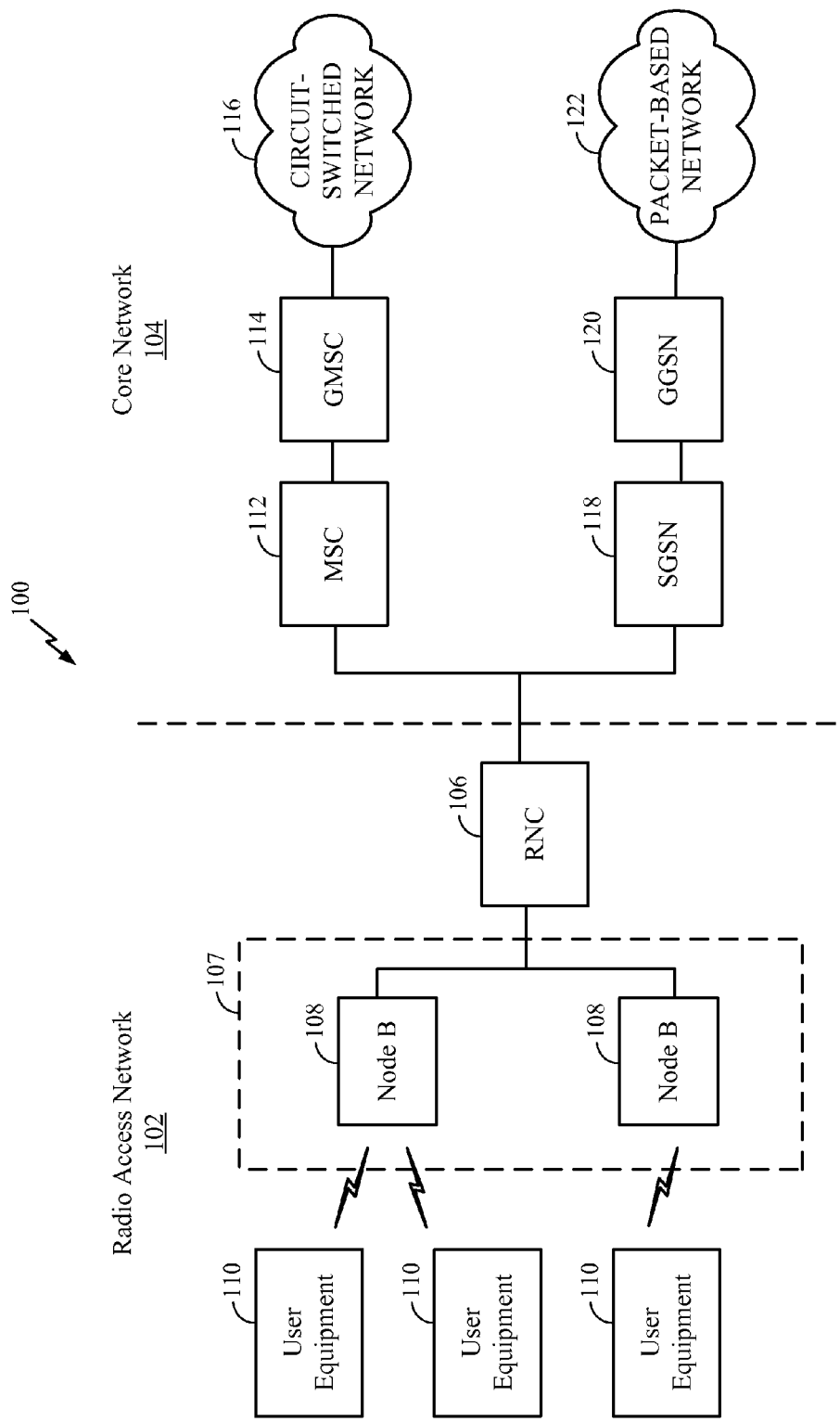
FIG. 1 is a block diagram conceptually illustrating an example of a telecommunications system in accordance with certain aspects of the present disclosure.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a radio access network (RAN) 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine a location of the UE and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
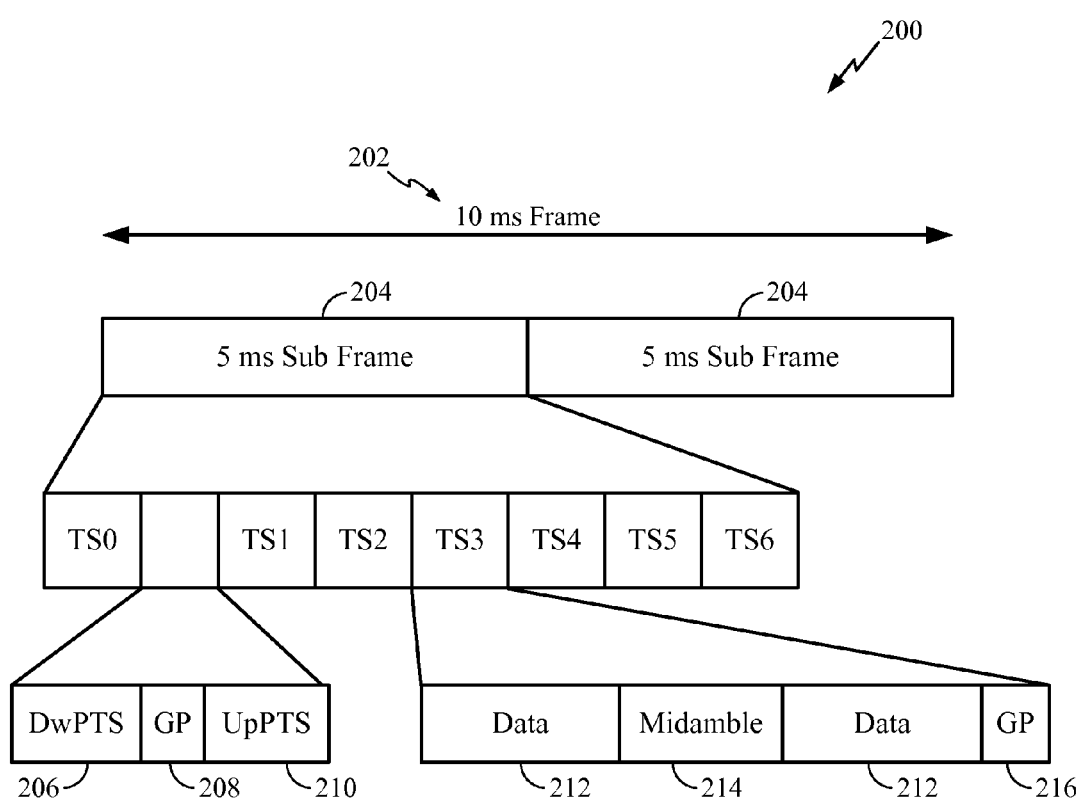
FIG. 2 is a block diagram conceptually illustrating an example of a Time Division Synchronous Code Division Multiple Access (TD-SCDMA) frame structure in accordance with certain aspects of the present disclosure.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
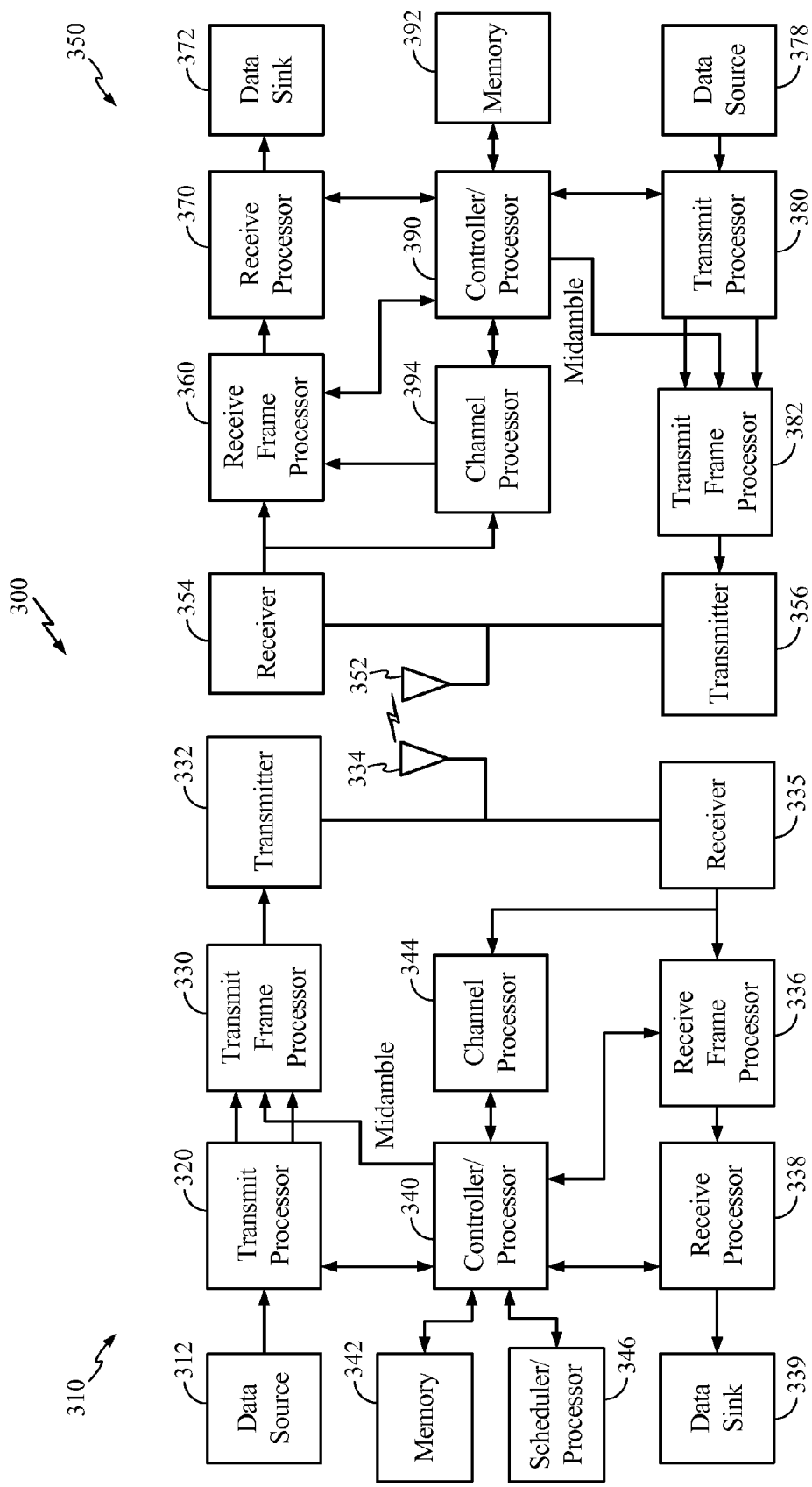
FIG. 3 is a block diagram conceptually illustrating an example of a Node B in communication with a user equipment device (UE) in a telecommunications system in accordance with certain aspects of the present disclosure.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer-readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

Example Overlying Radio Access Networks

In order to expand the services available to subscribers, some UEs support communications with multiple radio access technologies (RATs). In deployment of the TD-SCDMA service, the TD-SCDMA network can become a radio access network overlaid with other technologies, such as TDD-LTE (Time Division Duplex Long Term Evolution, also known as LTE-TDD or TD-LTE), CDMA 1xRTT (Radio Transmission Technology), Evolution-Data Optimized (EVDO), or Wideband CDMA (WCDMA). A multimode terminal (MMT)—supporting, e.g., TD-SCDMA and TDD-LTE—may register with both networks to provide services.

Figure 4:
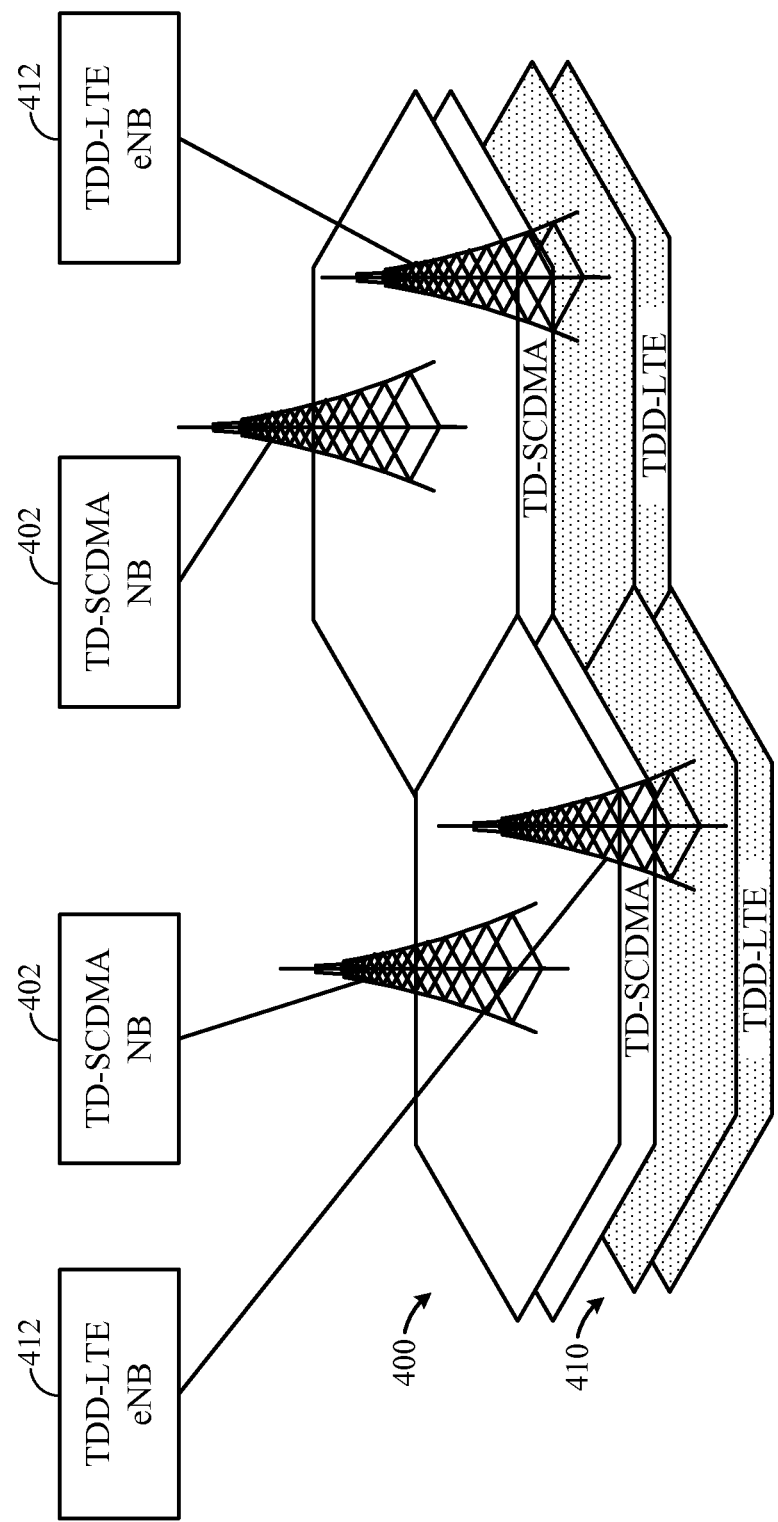
FIG. 4 illustrates an example TD-SCDMA network overlaid on an example Time Division Duplex Long Term Evolution (TDD-LTE) network in accordance with certain aspects of the present disclosure.

FIG. 4 illustrates an example TD-SCDMA network 400 overlaid on an example TDD-LTE network 410. An MMT (not shown) may communicate with either or both networks 400, 410 via TD-SCDMA node Bs (NBs) 402 and/or TDD-LTE evolved node Bs (eNBs) 412. For example, one use case may involve the MMT registering with the TDD-LTE network 410 for data service and with the TD-SCDMA network 400 for voice call service. Another use case may occur when the MMT has two subscriber identity modules (SIMs): one for TDD-LTE and another for TD-SCDMA.

Figure 5A:
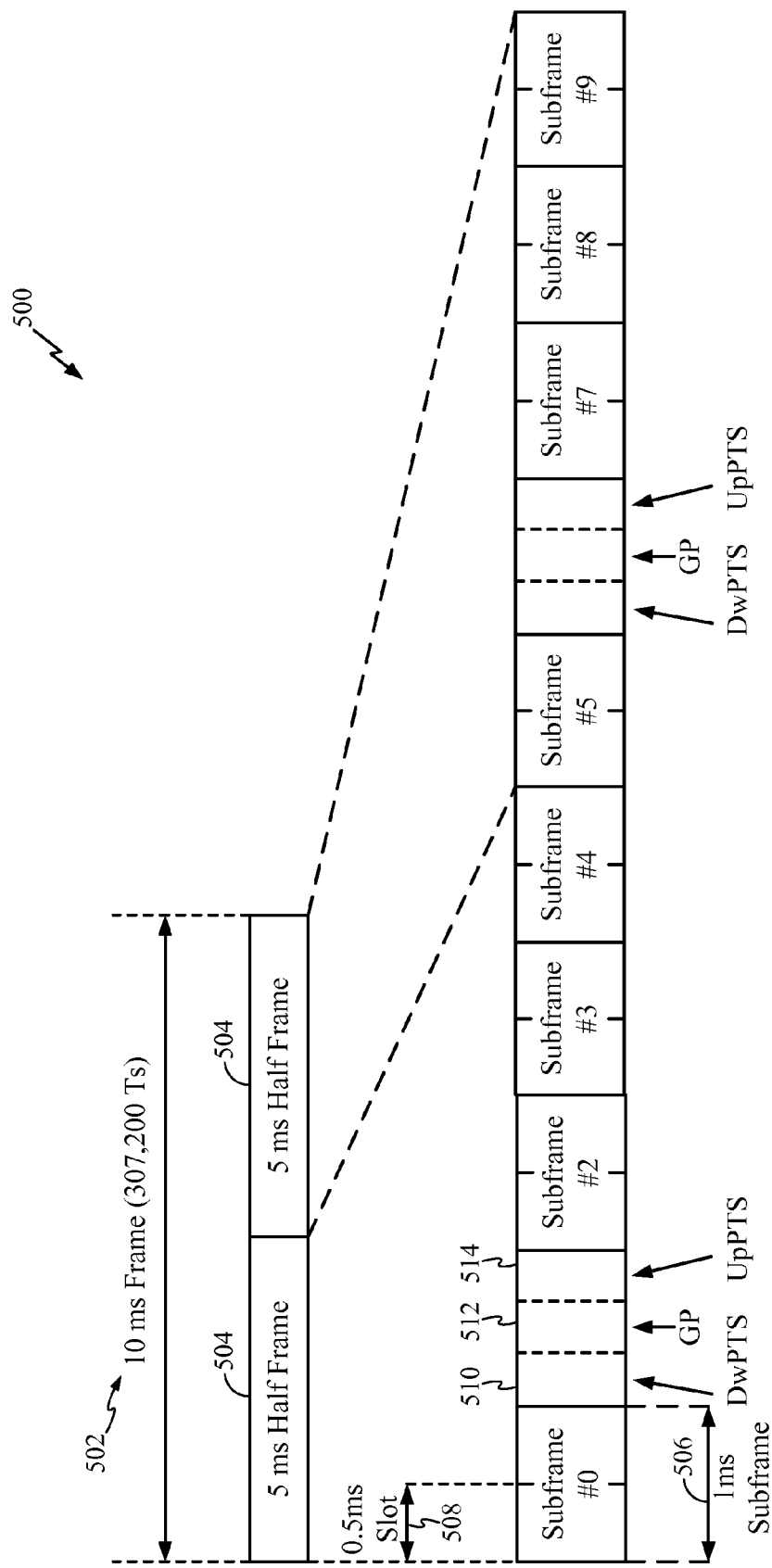
FIG. 5A is a block diagram conceptually illustrating an example of a TDD-LTE frame structure in accordance with certain aspects of the present disclosure.

FIG. 5A shows a frame structure 500 for a Time Division Duplex Long Term Evolution (TDD-LTE) carrier. The TDD-LTE carrier, as illustrated, has a frame 502 that is 10 ms in length. The frame 502 has two 5 ms half frames 504, and each of the half frames 504 includes five 1 ms subframes 506. Each subframe 506 may be a downlink subframe (D), an uplink subframe (U), or a special subframe (S). Downlink subframes and uplink subframes may be divided into two 0.5 ms slots 508. Special subframes may be divided into a downlink pilot time slot (DwPTS) 510, a guard period (GP) 512, and an uplink pilot time slot (UpPTS) 514. Depending on the configuration, the duration of DwPTS, UpPTS, and GP may vary.

Figure 5B:
FIG. 5B is a table of downlink/uplink (DL/UL) subframe configurations for the TDD-LTE frame of FIG. 5A in accordance with certain aspects of the present disclosure.

FIG. 5B is a table 550 of the downlink/uplink (DL/UL) subframe configurations for the TDD-LTE frame 502 according to the LTE standard. In this table D, U, and S indicate Downlink, Uplink, and Special subframes 506, respectively. The special subframe S may consist of DwPTS 510, GP 512, and UpPTS 514 fields. As illustrated, several UL-DL configurations for 5 ms switch-point periodicity (i.e., two Special subframes per LTE frame 502 spaced 5 ms apart) and 10 ms switch-point periodicity (i.e., one Special subframe per LTE frame 502) may be chosen for a TDD-LTE frame 502. Configurations 0, 1, and 2 have two identical 5 ms half frames 504 within a 10 ms TDD-LTE frame 502. In certain aspects, according to the LTE specification, an evolved node B (eNB) broadcasts the UL-DL configuration and special subframe configuration using a SIB-1 (System Information Block Type 1) message. The SIB-1 is typically transmitted on PDSCH (Physical Downlink Shared Channel) in subframe 5 of every even system frame number (SFN).

An Example Method to Perform Reference Signal Measurements in TDD-LTE from a TD-SCDMA System According to certain aspects, UEs capable of accessing both TD-SCDMA and TDD-LTE networks typically undergo handover (HO) procedures to switch between the two networks. To allow handover of a UE from a TD-SCDMA system to a TDD-LTE system, the TD-SCDMA system may command the UE to measure Reference Signal Receive Power (RSRP) and/or Reference Signal Receive Quality (RSRQ) of reference signals (RSs) received from the TDD-LTE network. The RSRP is an LTE measurement providing a cell-specific signal strength metric. This measurement is mainly used to rank different LTE cells according to their signal strength as an input for handover and cell reselection decisions. The RSRQ is an LTE measurement that offers a cell-specific signal quality metric. Similar to the RSRP, the RSRQ is primarily used to rank different LTE cells according to their signal quality as an input for handover and cell reselection decisions, for example in scenarios for which RSRP measurements do not provide sufficient information to perform reliable mobility decisions.

Figure 6:
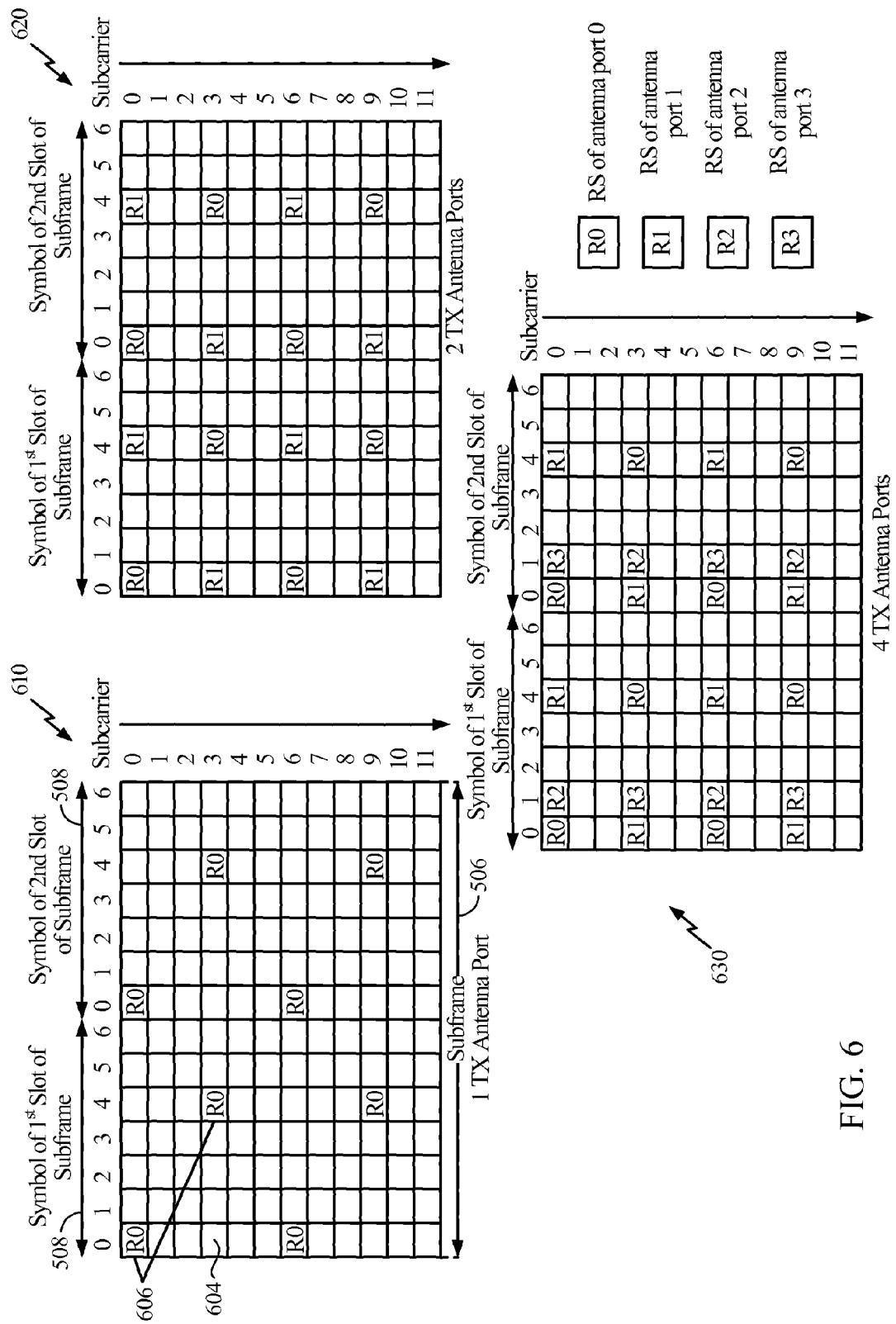
FIG. 6 illustrates example mapping of reference signals (RSs) to specific resource elements (REs) for various transmit (TX) antenna port configurations in a TDD-LTE network in accordance with certain aspects of the present disclosure.

FIG. 6 illustrates example mapping of RSs to specific resource elements (REs) for different transmit (TX) antenna port configurations in a TDD-LTE network in accordance with certain aspects of the present disclosure. As discussed above with reference to FIG. 5A each subframe 506 of a TDD-LTE frame 502 may further be divided into two slots 508, each of 0.5 ms duration. Signals for transmission in each slot 508 may be represented by a two-dimensional time and frequency (i.e., subcarrier) resource grid (e.g., 610, 620, and 630). The LTE specification defines a resource block (RB) as consisting of 12 consecutive subcarriers for one slot (0.5 ms) in duration. In certain aspects, each slot 508 over one subcarrier may consist of either 6 or 7 OFDM symbols, depending on whether a normal or extended cyclic prefix (CP) is employed. For example, in FIG. 6, each slot 508 over one subcarrier includes 7 symbols (0-6). Each box within the resource grid (e.g., 610) represents a single subcarrier for one symbol period and is referred to as a resource element (RE) 604.

In contrast to packet-oriented networks, LTE does not employ a preamble to facilitate carrier offset estimation, channel estimation, timing synchronization, and the like. Instead, special reference signals (RSs) 606 are embedded in the RBs as shown in FIG. 6. The cell-specific reference signals 606 are transmitted on specific REs on each RB according to a pattern based on the TX antenna port configuration.

For example, resource grid 610 represents an RE configuration for a single TX antenna port (antenna port 0), resource grid 620 represents an RE configuration for two TX antenna ports (antenna ports 0-1), and resource grid 630 represents an RE configuration for four TX antenna ports (antenna ports 0-3). As shown in FIG. 6, R0 represents the reference signals 606 for antenna port 0, R1 represents the reference signals for antenna port 1, R2 represents the reference signals for antenna port 2, and R3 represents the reference signal for antenna port 3. In all three TX antenna port configurations, R0 reference signals are typically transmitted during first and fifth OFDM symbols of each slot (as shown in FIG. 6) when a short cyclic prefix (CP) is used and during first and fourth OFDM symbols when a long CP is used.

The reference signals 606 may be generated as a symbol-by-symbol product of a two-dimensional orthogonal sequence and a two-dimensional pseudo-random numerical (PRN) sequence. According to LTE specifications, there are three different two-dimensional orthogonal sequences and 168 different two-dimensional PRN sequences. Thus, there may be 504 unique reference signal patterns possible. In certain aspects, a unique reference signal 606 is assigned to each cell within a network and acts as a cell-specific identifier (a cell ID). Each unique reference signal 606 corresponds to a unique combination of one orthogonal sequence and one PRN sequence, thus allowing 504 unique cell IDs (168 cell ID groups with 3 cell IDs in each group).

For certain aspects, frequency hopping may be applied to the cell-specific DL reference signals 606. The frequency-hopping pattern typically has a period of one TDD-LTE frame (10ms). Each frequency-hopping pattern may correspond to one cell ID group.

To measure the TDD-LTE reference signals, the TD-SCDMA network may provide the UE with an Idle Interval Information IE (information element) in the Measurement Control message of the TD-SCDMA network. The UE may use the TD-SCDMA idle interval to at least temporarily leave the TD-SCDMA network in order to perform LTE reference signal measurements. The timing of the TD-SCDMA frames for LTE reference signal measurements during the TD-SCDMA idle interval is typically defined by the TD-SCDMA System Frame Number (SFN) according to the following equation:

$$\text{SFN mod } (2^m) = \text{Offset}$$

In the above equation, parameter m is an index of the TD-SCDMA idle interval period, where m=2, 3, and therefore the idle interval period may be 4 or 8 radio frames. Offset defines an offset within the idle interval period, where Offset=0, 1, ..., 7.

Figure 7:
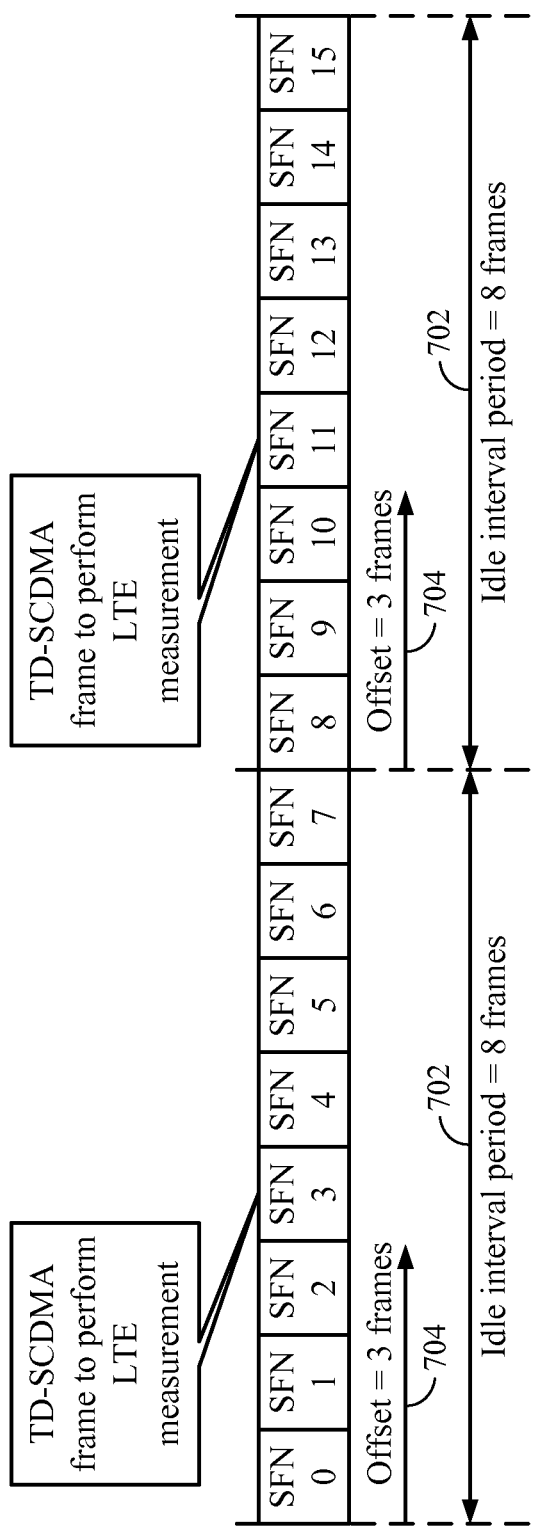
FIG. 7 illustrates periodically performing TDD-LTE RS measurements during certain TD-SCDMA frames at a particular TD-SCDMA idle interval period in accordance with certain aspects of the present disclosure.

FIG. 7 illustrates particular TD-SCDMA frames in a TD-SCDMA idle interval period during which to perform TDD-LTE reference signal measurements, in accordance with certain aspects of the present disclosure. In the example of FIG. 7, the idle interval 702 is eight frames (i.e., m=3), and the offset 704 is 3 frames defined within each interval 702. Thus, a fourth radio frame within each idle interval 702 may be used for LTE reference signal measurement, such that SFN 3 and SFN 11 are designated as shown.

The UE, in order to be able to measure the LTE reference signals, may most likely need information with respect to the downlink subframe numbers of the subframes that carry the reference signals, the LTE cell identities, and the antenna port configurations. As discussed above with respect to FIG. 5B, an evolved node B (eNB) in an LTE network broadcasts the UL-DL configuration using the SIB-1 (System Information Block Type 1) message. The UEs may acquire cell identity information from the Primary Synchronization Signal (PSS) and Secondary Synchronization Signal (SSS) as defined in the LTE specifications. The PSS is a sequence transmitted by every LTE cell every 5 ms, which allows the UE to obtain slot synchronization and part of the physical layer cell ID. The SSS is used by the UE to detect the LTE frame timing and to obtain the physical layer cell identity group. The SSS is transmitted twice in each 10 ms LTE frame.

The antenna port configuration may be known from the Cyclic Redundancy Check (CRC) mask of the Master Information Block (MIB) transmitted on the physical broadcast channel (PBCH). The MIB is defined in the LTE specification as a block of system information that includes a limited number of the most frequently transmitted parameters that are essential for a UE's initial access to an LTE network.

Typically, a UE may take multiple idle intervals 702 to measure the LTE reference signals because the UE may need to first acquire the PSS-SSS, which may itself require at least one idle interval. In order to expedite the measurement, the TD-SCDMA NB may specify the cell ID of a TDD-LTE eNB so that the UE may skip acquisition of the PSS-SSS and immediately proceed to measuring the signal sequence once the TDD-LTE frame timing is known.

However, the UE may not know the UL-DL configuration of the LTE frame being transmitted and, thus, may not know which of the subframes is a downlink subframe with the reference signals to measure. For example, if the UL-DL configuration is type 2 (refer to FIG. 5B), only subframes 0, 3, 4, 5, 8 and 9 are downlink subframes suitable for reference signal measurement. If the UE attempts to measure a UL subframe or a special subframe, there may most likely be errors.

Accordingly, what is needed are techniques and apparatus to perform expedited and accurate measurement of TDD-LTE reference signals while operating in a TD-SCDMA network.

Certain aspects of the present disclosure provide various methods and apparatus for performing measurement of reference signals in the proper subframes of a first radio access technology (RAT) while operating in a second RAT.

Option 1 for Efficient Measurement of LTE Reference Signals

According to certain aspects, once a UE acquires the TDD-LTE frame boundary, the UE may consider only subframes 0 and/or 5 for measuring the reference signals 606, irrespective of the UL-DL configuration of a given TDD-LTE frame. FIG. 8 illustrates a table 800 based on the table 550 of FIG. 5B with subframes 0 and 5 encircled for the various frame configurations (i.e., the rows of the table 800) by loops 802, 804. As shown in FIG. 8, subframes 0 and 5 are always defined as downlink subframes in each of the UL-DL configurations 0-6. Therefore, loops 802, 804 indicate the subframes having a downlink transmission type (i.e., DL subframes) common to all UL-DL configurations. Thus, if the UE measures only subframes 0 and/or 5, the UE need not know the UL-DL configuration and may certainly avoid trying to measure reference signals during a UL subframe or a special subframe.

Furthermore, for certain aspects, only RSs for TX antenna port 0 are measured. For these aspects, the UE need not acquire the MIB.

Figure 9:
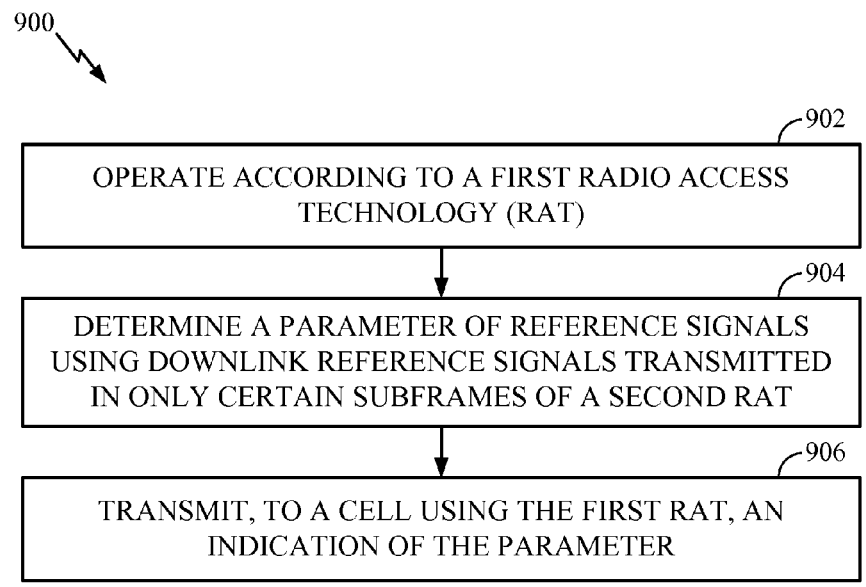
FIG. 9 is a functional block diagram conceptually illustrating example blocks executed to determine, while operating according to a first radio access technology (RAT), a parameter of reference signals using downlink reference signals transmitted in only certain subframes of the second RAT, in accordance with certain aspects of the present disclosure.

FIG. 9 is a functional block diagram conceptually illustrating example blocks 900 executed to determine, while operating according to a first radio access technology (RAT) such as TD-SCDMA, a parameter of reference signals using downlink reference signals transmitted in only certain subframes of a second RAT (e.g., TDD-LTE). Operations illustrated by the blocks 900 may be executed, for example, at the processor(s) 370, 394, and/or 390 and the transmitter 356 of the UE 350 from FIG. 3. The operations may begin, at 902, by operating according to a first RAT. At 904, a parameter of reference signals may be determined using downlink reference signals transmitted in only certain subframes of a second RAT. The UE may determine the parameter by measuring the received power of the downlink reference signals, and the parameter may comprise the RSRP and/or the RSRQ. At 906, the UE may transmit an indication of the parameter to a cell using the first RAT. For certain aspects, the UE may transmit a request to handover to a cell using the second RAT based on the parameter.

Option 2 for Efficient Measurement of LTE Reference Signals

According to certain aspects, a TD-SCDMA cell may transmit an information element (IE) (e.g., a subframeAssignment IE) indicating a TDD-LTE subframe assignment (i.e., the UL-DL configuration 0-6) as part of the TD-SCDMA Measurement Control message. In this manner, the UE may be told in advance which subframes comprise the downlink cell-specific reference signals. For certain aspects, the Measurement Control message may also indicate an antenna port configuration (e.g., in an antennaPortsCount IE). In this manner, the UE may know the reference signal pattern based on the TX antenna port configuration. Once TDD-LTE frame timing is acquired, a UE may use the subframe assignment and antenna port configuration received from the TD-SCDMA cell to quickly and correctly measure the LTE reference signals on the proper subframes.

Figure 10:
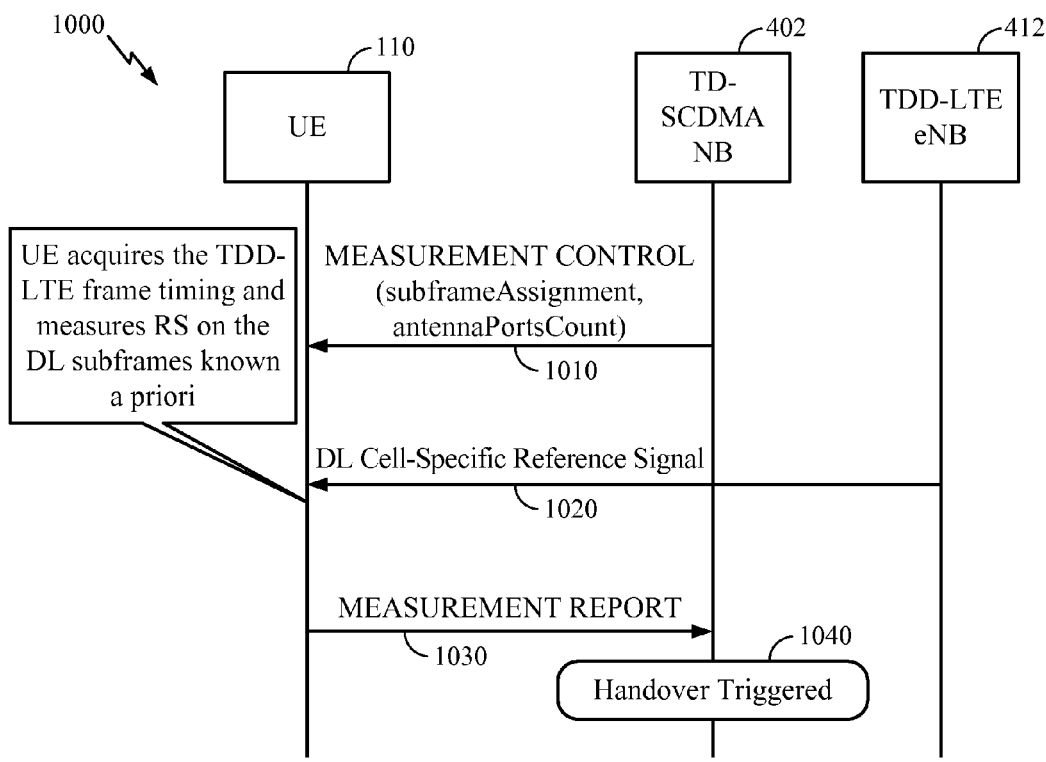
FIG. 10 is a call flow conceptually illustrating transmission of a TD-SCDMA message indicating a TDD-LTE UL-DL configuration and/or a TX antenna port configuration for measuring TDD-LTE cell-specific RSs, in accordance with certain aspects of the present disclosure.

FIG. 10 is a call flow 1000 conceptually illustrating transmission of a TD-SCDMA message indicating a TDD-LTE UL-DL configuration and/or a TX antenna port configuration for measuring TDD-LTE cell-specific RSs. The UE 110 is an MMT capable of accessing both TD-SCDMA and TDD-LTE networks 400, 410 via a TD-SCDMA NB 402 and a TDD-LTE eNB 412. At 1010, the TD-SCDMA NB 402 may transmit a Measurement Control message to the UE 110. The Measurement Control message may include a subframeAssignment IE indicating the TDD-LTE UL-DL configuration. For certain aspects, the Measurement Control message may also include an antennaPortsCount IE indicating the TX antenna port configuration.

At 1020, the UE 110 may then acquire the TDD-LTE frame timing and receive downlink (DL) cell-specific reference signals from the TDD-LTE eNB 412. Because the DL/UL subframe configuration (and for certain aspects, the antenna port configuration) are known a priori based on IEs in the Measurement Control message, the UE may measure the LTE reference signals. Having this information beforehand enables the UE to measure more reference signals (and, therefore, report more accurate RSRP/RSRQ measurements results) in the same amount of time as conventional measurements and/or report the measurements more quickly. For example, this measurement may be performed during a single idle interval 702 for certain aspects since the PSS and SSS need not be acquired in order to measure the LTE reference signals.

After measuring the reference signals, the UE 110 may send a measurement report at 1030 to the TD-SCDMA NB 402 reporting results of the LTE reference signal measurements, such as the RSRP or the RSRQ. Based on the received measurement report, the TD-SCDMA NB 402 may continue communicating with the UE 110 or may trigger a handover of the UE to the TDD-LTE eNB 412 at 1040.

Figure 11:
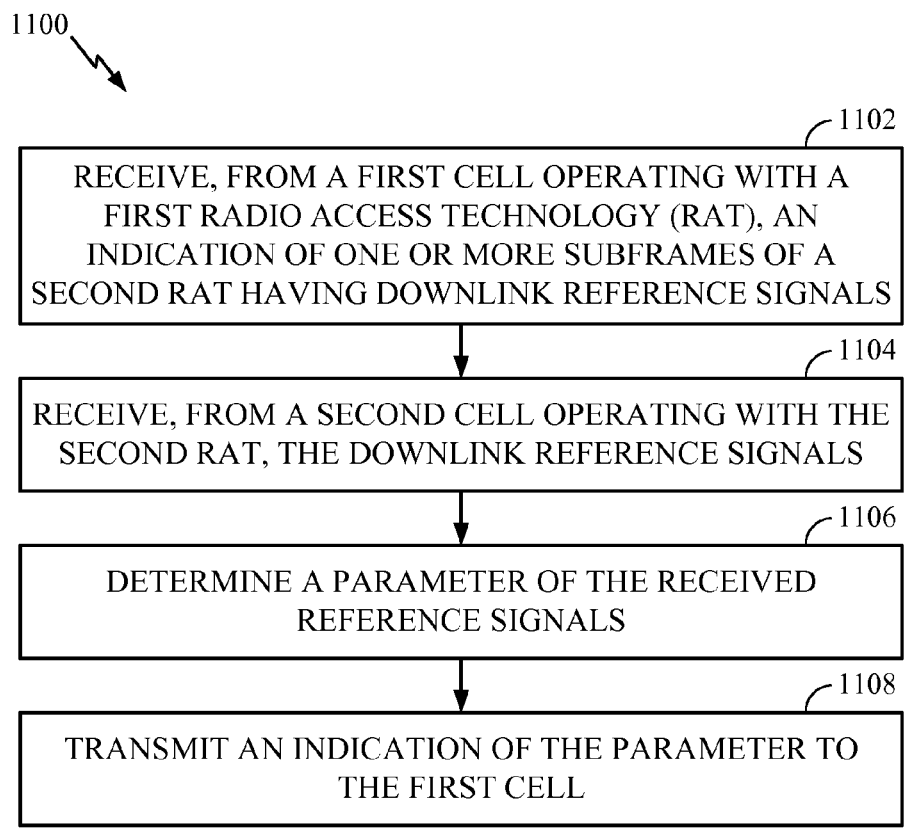
FIG. 11 is a functional block diagram conceptually illustrating example blocks executed to determine a parameter of received downlink reference signals, in accordance with certain aspects of the present disclosure.

FIG. 11 is a functional block diagram conceptually illustrating example blocks 1100 executed to determine a parameter of received downlink reference signals. Operations illustrated by the blocks 1100 may be executed, for example, at the receiver 354, the processor(s) 370, 380, 394, and/or 390, and the transmitter 356 of the UE 350 from FIG. 3. The operations may begin, at 1102, by receiving, from a first cell operating with a first RAT (e.g., TD-SCDMA), an indication of one or more subframes of a second RAT (e.g., TDD-LTE) having downlink reference signals. At 1104, the downlink reference signals may be received from a second cell operating with the second RAT. At 1106, the UE may determine a parameter of the received reference signals, such as the RSRP or the RSRQ. The UE may determine the parameter by measuring the received power of the reference signals. The UE may transmit an indication of the parameter to the first cell at 1108.

Figure 12:
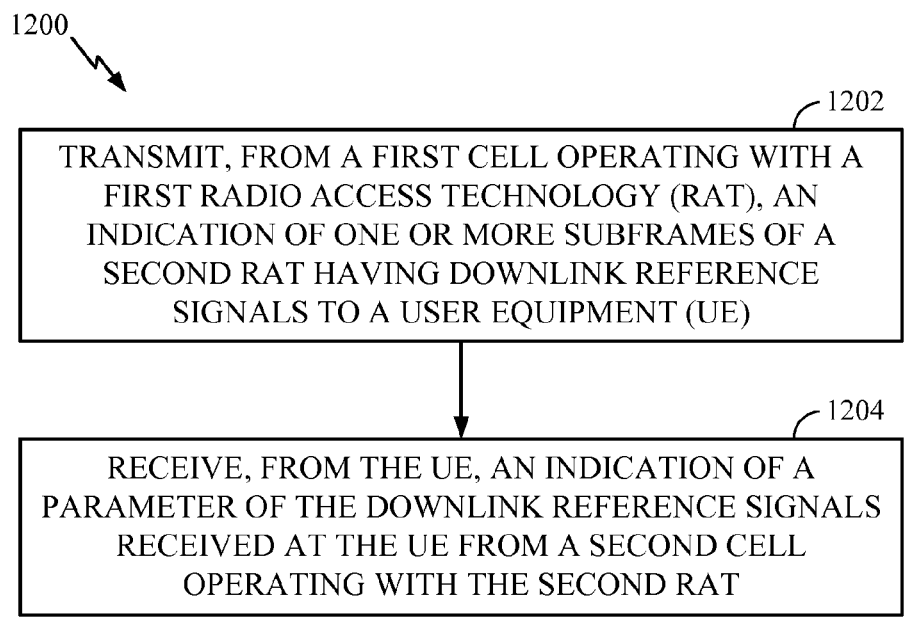
FIG. 12 is a functional block diagram conceptually illustrating example blocks executed to indicate to a UE the subframes during which to determine a parameter of downlink reference signals, in accordance with certain aspects of the present disclosure.

FIG. 12 is a functional block diagram conceptually illustrating example blocks 1200 executed to indicate to a UE the subframes during which to determine a parameter of downlink reference signals. Operations illustrated by the blocks 1200 may be executed, for example, at the receiver 335 and the transmitter 332 of the Node B 310 from FIG. 3. The operations may begin, at 1202, by transmitting, from a first cell (e.g., TD-SCDMA Node B 402) operating with a first RAT (e.g., TD-SCDMA), an indication of one or more subframes of a second RAT (e.g., TDD-LTE) having downlink reference signals to a UE. At 1204, the first cell may receive an indication from the UE of a parameter of the downlink reference signals received at the UE from a second cell (e.g., TDD-LTE eNB 412) operating with the second RAT.

Figure 13:
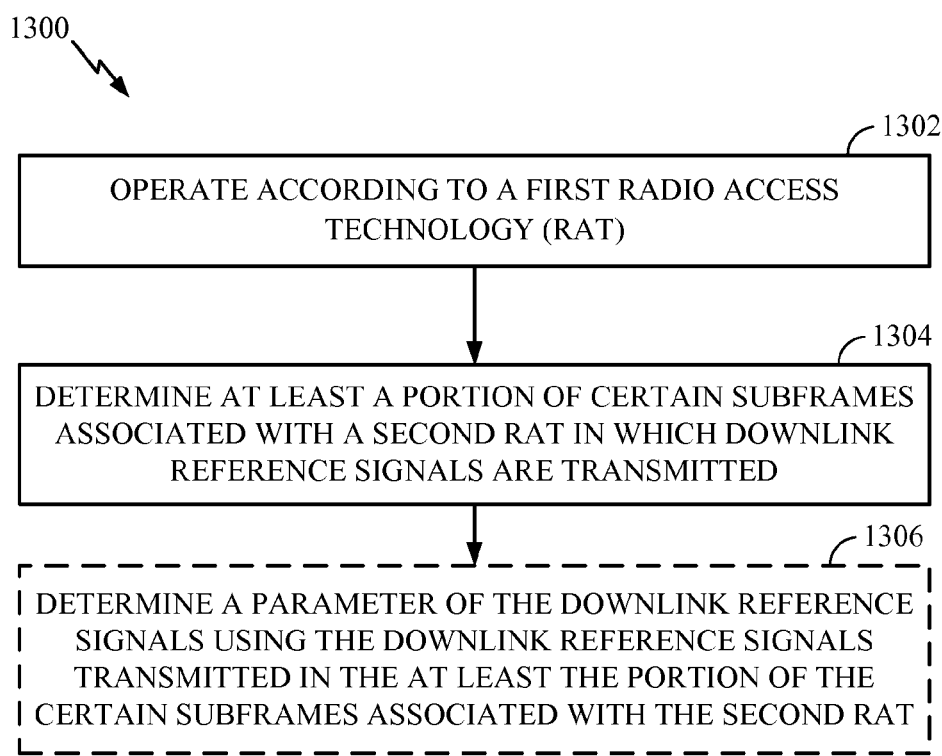
FIG. 13 is a functional block diagram conceptually illustrating example blocks executed to identify certain subframes associated with a second RAT in which downlink reference signals are transmitted, in accordance with certain aspects of the present disclosure.

FIG. 13 is a functional block diagram conceptually illustrating example blocks 1300 executed to identify certain subframes associated with a second RAT in which downlink reference signals are transmitted. Operations illustrated by the blocks 1300 may be executed, for example, at the processor(s) 370, 394, and/or 390 of the UE 350 from FIG. 3. The operations may begin, at 1302, by operating according to a first RAT. At 1304, the UE determines at least a portion of certain subframes associated with a second RAT in which downlink reference signals are transmitted. For certain aspects, this determination may be known beforehand and may be made by obtaining an indication of the (at least a) portion of the certain subframes from a memory or other storage. For certain aspects, the portion of the certain subframes is common to a plurality of frame configurations of the second RAT. That is, for each of a plurality of frame configurations, each configuration is characterized at least in part by a uniquely ordered set of transmission types, and certain subframes are of a common transmission type across the unique configurations. These aspects may be based on Option 1 as described above. For other aspects the determination may be based on a received indication of the portion of the certain subframes from a first cell operating according to the first RAT, wherein the downlink reference signals are transmitted from a second cell operating according to the second RAT. Such aspects may be based on Option 2 as described above.

For certain aspects, the UE may optionally determine at 1306 a parameter of the downlink reference signals using the downlink reference signals transmitted in the portion of the certain subframes associated with the second RAT. The UE may determine the parameter by measuring the received power of the downlink reference signals, and the parameter may comprise the RSRP and/or the RSRQ.

With certain aspects of the present disclosure, a correct TDD-LTE subframe configuration may be provided to expedite reference signal measurements. By providing fast and accurate measurements of TDD-LTE reference signals, handover from a TD-SCDMA NB to a TDD-LTE eNB may be accurately triggered.

Several aspects of a telecommunications system have been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read-only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method for wireless communications, comprising:
   operating according to a first radio access technology (RAT);
   determining at least a portion of certain subframes associated with a second RAT in which downlink reference signals are transmitted; and
   determining a parameter of the downlink reference signals based at least in part on the downlink reference signals transmitted in at least the portion of certain subframes associated with the second RAT.

2. The method of claim 1, wherein the determining at least a portion of certain subframes comprises obtaining, from a memory, an indication of the at least a portion of certain subframes.

3. The method of claim 2, wherein the at least a portion of certain subframes is common to a plurality of frame configurations of the second RAT.

4. The method of claim 3, wherein each frame configuration of the plurality of frame configurations comprises a plurality of subframes uniquely ordered according to a transmission type.

5. The method of claim 4, wherein the subframes in the at least a portion of certain subframes common to the plurality of frame configurations have a downlink transmission type.

6. The method of claim 5, wherein each frame configuration includes ten subframes numbered 0 through 9, and wherein the at least a portion of certain subframes includes at least one of subframe 0 or subframe 5.

7. The method of claim 1, wherein the determining at least a portion of certain subframes comprises receiving an indication of the at least a portion of certain subframes from a first cell operating according to the first RAT, and wherein the downlink reference signals are transmitted from a second cell operating according to the second RAT.

8. The method of claim 7, wherein the indication is received in a measurement control message.

9. The method of claim 7, further comprising receiving an indication of a number of antennas used to transmit the downlink reference signals.

10. The method of claim 9, wherein the indication of the number of antennas is received in a measurement control message.

11. The method of claim 1, wherein the determining the parameter of the downlink reference signals comprises measuring the parameter using reference signals transmitted from a single antenna.

12. The method of claim 1, further comprising transmitting a request to handover to a cell operating according to the second RAT based on the parameter.

13. The method of claim 1, further comprising transmitting an indication of the parameter to a cell operating according to the first RAT.

14. The method of claim 1, wherein the parameter comprises a reference signal receive power.

15. The method of claim 1, wherein the parameter comprises a reference signal receive quality.

16. The method of claim 1, wherein the first RAT comprises time division-synchronous code division multiple access (TD-SCDMA) and the second RAT comprises time division duplex long term evolution (TDD-LTE).

17. An apparatus for wireless communications, comprising:
means for operating according to a first radio access technology (RAT);
means for determining at least a portion of certain subframes associated with a second RAT in which downlink reference signals are transmitted; and
means for determining a parameter of the downlink reference signals based at least in part on the downlink reference signals transmitted in at least the portion of certain subframes associated with the second RAT.

18. The apparatus of claim 17, wherein the means for determining at least a portion of certain subframes is configured to obtain, from a storage means, an indication of the at least a portion of certain subframes.

19. The apparatus of claim 18, wherein the at least a portion of certain subframes is common to a plurality of frame configurations according to the second RAT.

20. The apparatus of claim 19, wherein each frame configuration of the plurality of frame configurations comprises a plurality of subframes uniquely ordered according to a transmission type.

21. The apparatus of claim 20, wherein the subframes in the at least a portion of certain subframes common to the plurality of frame configurations have a downlink transmission type.

22. The apparatus of claim 21, wherein each frame configuration includes ten subframes, and wherein the at least a portion of certain subframes includes at least one of the first and sixth subframes.

23. The apparatus of claim 17, wherein the means for determining at least a portion of certain subframes is configured to receive an indication of the at least a portion of certain subframes from a first cell operating according to the first RAT, and wherein the downlink reference signals are transmitted from a second cell operating according to the second RAT.

24. The apparatus of claim 23, wherein the indication is received in a measurement control message.

25. The apparatus of claim 23, further comprising means for receiving an indication of a number of antennas used to transmit the downlink reference signals.

26. The apparatus of claim 25, wherein the indication of the number of antennas is received in a measurement control message.

27. The apparatus of claim 17, wherein the means for determining the parameter of the downlink reference signals is configured to measure the parameter using reference signals transmitted from a single antenna.

28. The apparatus of claim 17, further comprising means for transmitting a request to handover to a cell operating according to the second RAT based on the parameter.

29. The apparatus of claim 17, further comprising means for transmitting an indication of the parameter to a cell operating according to the first RAT.

30. The apparatus of claim 17, wherein the parameter comprises a reference signal receive power.

31. The apparatus of claim 17, wherein the parameter comprises a reference signal receive quality.

32. The apparatus of claim 17, wherein the first RAT comprises time division-synchronous code division multiple access (TD-SCDMA) and the second RAT comprises time division duplex long term evolution (TDD-LTE).

33. An apparatus for wireless communications, comprising:
at least one processor configured to:
operate according to a first radio access technology (RAT);
determine at least a portion of certain subframes associated with a second RAT in which downlink reference signals are transmitted; and
determine a parameter of the downlink reference signals based at least in part on the downlink reference signals transmitted in at least the portion of certain subframes associated with the second RAT; and
a memory coupled to the at least one processor.

34. The apparatus of claim 33, wherein the at least one processor is further configured to determine the at least a portion of certain subframes by obtaining, from the memory, an indication of the at least a portion of certain subframes.

35. The apparatus of claim 34, wherein the at least a portion of certain subframes is common to a plurality of frame configurations of the second RAT.

36. The apparatus of claim 35, wherein each frame configuration of the plurality of frame configurations comprises a plurality of subframes uniquely ordered according to a transmission type.

37. The apparatus of claim 36, wherein the subframes in the at least a portion of certain subframes common to the plurality of frame configurations have a downlink transmission type.

38. The apparatus of claim 37, wherein each frame configuration includes ten subframes, and wherein the at least a portion of certain subframes includes at least one of the first and sixth subframes.

39. The apparatus of claim 33, wherein the at least one processor is further configured:
to receive an indication of the at least a portion of certain subframes from a first cell operating according to the first RAT, and
to determine the at least a portion of certain subframes by using the indication, and wherein the downlink reference signals are transmitted from a second cell operating according to the second RAT.

40. The apparatus of claim 39, wherein the indication is received in a measurement control message.

41. The apparatus of claim 39, wherein the receiver is further configured to receive an indication of a number of antennas used to transmit the downlink reference signals.

42. The apparatus of claim 41, wherein the indication of the number of antennas is received in a measurement control message.

43. The apparatus of claim 33, wherein the at least one processor is configured to determine the parameter of the downlink reference signals by measuring the parameter using reference signals transmitted from a single antenna.

44. The apparatus of claim 33, wherein the at least one processor is further configured to transmit a request to handover to a cell operating according to the second RAT based on the parameter.

45. The apparatus of claim 33 wherein the at least one processor is further configured to transmit an indication of the parameter to a cell operating according to the first RAT.

46. The apparatus of claim 33, wherein the parameter comprises a reference signal receive power.

47. The apparatus of claim 33, wherein the parameter comprises a reference signal receive quality.

48. The apparatus of claim 33, wherein the first RAT comprises time division-synchronous code division multiple access (TD-SCDMA) and the second RAT comprises time division duplex long term evolution (TDD-LTE).

49. A computer-program product for wireless communications, the computer-program product comprising:
a non-transitory computer-readable medium comprising code for:
operating according to a first radio access technology (RAT);
determining at least a portion of certain subframes associated with a second RAT in which downlink reference signals are transmitted; and
determining a parameter of the downlink reference signals based at least in part on the downlink reference signals transmitted in at least the portion of certain subframes associated with the second RAT.

50. The computer-program product of claim 49, wherein the determining at least a portion of certain subframes comprises obtaining, from a storage, an indication of the at least a portion of certain subframes.

51. The computer-program product of claim 50, wherein the at least a portion of certain subframes is common to a plurality of frame configurations of the second RAT.

52. The computer-program product of claim 51, wherein each frame configuration of the plurality of frame configurations comprises a plurality of subframes uniquely ordered according to a transmission type.

53. The computer-program product of claim 52, wherein the subframes in the at least a portion of certain subframes common to the plurality of frame configurations have a downlink transmission type.

54. The computer-program product of claim 53, wherein each frame configuration includes ten subframes numbered 0 through 9, and wherein the at least a portion of certain subframes includes at least one of the first and sixth subframes.

55. The computer-program product of claim 49, wherein the determining at least a portion of certain subframes comprises receiving an indication of the at least a portion of certain subframes from a first cell operating according to the first RAT, and wherein the downlink reference signals are transmitted from a second cell operating according to the second RAT.

56. The computer-program product of claim 55, wherein the indication is received in a measurement control message.

57. The computer-program product of claim 55, further comprising code for receiving an indication of a number of antennas used to transmit the downlink reference signals.

58. The computer-program product of claim 57, wherein the indication of the number of antennas is received in a measurement control message.

59. The computer-program product of claim 49, wherein the determining the parameter of the downlink reference signals comprises measuring the parameter using reference signals transmitted from a single antenna.

60. The computer-program product of claim 49, further comprising code for transmitting a request to handover to a cell operating according to the second RAT based on the parameter.

61. The computer-program product of claim 49, further comprising code for transmitting an indication of the parameter to a cell operating according to the first RAT.

62. The computer-program product of claim 49, wherein the parameter comprises a reference signal receive power.

63. The computer-program product of claim 49, wherein the parameter comprises a reference signal receive quality.

64. The computer-program product of claim 49, wherein the first RAT comprises time division-synchronous code division multiple access (TD-SCDMA) and the second RAT comprises time division duplex long term evolution (TDD-LTE).

65. A method for wireless communications, comprising:
transmitting to a user equipment (UE) a first indication of one or more subframes of a second RAT, the first indication being transmitted from a first cell operating with a first radio access technology (RAT), the first indication indicating one or more subframes of the second RAT having downlink reference signals; and
receiving, from the UE, a second indication of a parameter of the downlink reference signals received at the UE from a second cell operating with the second RAT.

66. The method of claim 65, further comprising receiving, from the UE, a request to handover from the first cell to the second cell based on the parameter.

67. The method of claim 65, wherein transmitting the first indication comprises transmitting a measurement control message.

68. The method of claim 67, wherein the measurement control message comprises a subframe assignment information element (IE).

69. The method of claim 68, wherein the subframe assignment IE comprises an uplink and a downlink configuration of the subframes.

70. The method of claim 65, wherein the first RAT comprises time division-synchronous code division multiple access (TD-SCDMA).

71. The method of claim 70, wherein the second RAT comprises time division duplex long term evolution (TDD-LTE).

72. An apparatus for wireless communications, comprising:
- means for transmitting to a user equipment (UE) a first indication of one or more subframes of a second RAT, the first indication being transmitted from a first cell operating with a first radio access technology (RAT), the first indication indicating one or more subframes of the second RAT having downlink reference signals; and
- means for receiving, from the UE, a second indication of a parameter of the downlink reference signals received at the UE from a cell operating with the second RAT.

73. The apparatus of claim 72, further comprising means for receiving, from the UE, a request to handover from the apparatus to the cell based on the parameter.

74. The apparatus of claim 72, wherein the means for transmitting the first indication is configured to transmit a measurement control message.

75. The apparatus of claim 74, wherein the measurement control message comprises a subframe assignment information element (IE).

76. The apparatus of claim 75, wherein the subframe assignment IE comprises an uplink and a downlink configuration of the subframes.

77. The apparatus of claim 72, wherein the first RAT comprises time division-synchronous code division multiple access (TD-SCDMA).

78. The apparatus of claim 77, wherein the second RAT comprises time division duplex long term evolution (TDD-LTE).

79. An apparatus for wireless communications, comprising:
- a memory unit; and
- at least one processor coupled to the memory unit, the at least one processer configured:
  - to transmit to a user equipment (UE) a first indication of one or more subframes of a second RAT, the first indication being transmitted from a first cell operating with a first radio access technology (RAT), the first indication indicating one or more subframes of the second RAT having downlink reference signals; and
  - to receive, from the UE, a second indication of a parameter of the downlink reference signals received at the UE from a cell operating with the second RAT.

80. The apparatus of claim 79, wherein the at least one processor is further configured to receive, from the UE, a request to handover from the apparatus to the cell based on the parameter.

81. The apparatus of claim 79, wherein the transmitter is configured to transmit the first indication by transmitting a measurement control message.

82. The apparatus of claim 81, wherein the measurement control message comprises a subframe assignment information element (IE).

83. The apparatus of claim 82, wherein the subframe assignment IE comprises an uplink and a downlink configuration of the subframes.

84. The apparatus of claim 79, wherein the first RAT comprises time division-synchronous code division multiple access (TD-SCDMA).

85. The apparatus of claim 84, wherein the second RAT comprises time division duplex long term evolution (TDD-LTE).

86. A computer-program product for wireless communications, the computer-program product comprising:
- a non-transitory computer-readable medium comprising code for:
  - transmitting to a user equipment (UE) a first indication of one or more subframes of a second RAT, the first indication being transmitted from a first cell operating with a first radio access technology (RAT), the first indication indicating one or more subframes of the second RAT having downlink reference signals; and
  - receiving, from the UE, a second indication of a parameter of the downlink reference signals received at the UE from a second cell operating with the second RAT.

87. The computer-program product of claim 86, further comprising code for receiving, from the UE, a request to handover from the first cell to the second cell based on the parameter.

88. The computer-program product of claim 86, wherein transmitting the first indication comprises transmitting a measurement control message.

89. The computer-program product of claim 88, wherein the measurement control message comprises a subframe assignment information element (IE).

90. The computer-program product of claim 89, wherein the subframe assignment IE comprises an uplink and a downlink configuration of the subframes.

91. The computer-program product of claim 86, wherein the first RAT comprises time division-synchronous code division multiple access (TD-SCDMA).

92. The computer-program product of claim 91, wherein the second RAT comprises time division duplex long term evolution (TDD-LTE).

* * * * *